United States Patent [19]

Balleys et al.

[11] E Re. 31,494

[45] Reissued Jan. 10, 1984

[54] ELECTRIC DISCHARGE MACHINING METHOD AND DEVICE WITH PRESET ELECTRODE

[75] Inventors: Francois Balleys, Geneva; Jean Dupraz, Vaud, both of Switzerland

[73] Assignee: Ateliers des Charmilles, S.A., Geneva, Switzerland

[21] Appl. No.: 277,654

[22] Filed: Jun. 26, 1981

Related U.S. Patent Documents

Reissue of:

[64] Patent No.: 4,049,942
Issued: Sep. 20, 1977
Appl. No.: 668,750
Filed: Mar. 19, 1976

[30] Foreign Application Priority Data

Apr. 7, 1975 [CH] Switzerland ..... 4352/75

[51] Int. Cl.[3] ..... B23P 1/08

[52] U.S. Cl. ..... 219/69 M; 219/69 G; 318/626

[58] Field of Search ..... 219/69 M, 69 G, 69 V; 318/590, 596, 626, 652, 653; 364/474

[56] References Cited

U.S. PATENT DOCUMENTS

| | | | |
|---|---|---|---|
| 3,372,311 | 3/1968 | Arnold et al. | 210/387 |
| 3,372,311 | 3/1968 | Lobur | 367/154 |
| 3,536,881 | 10/1970 | Inoue | 219/69 G |
| 3,609,279 | 9/1971 | Giesbrecht | 219/69 G |
| 3,657,507 | 4/1972 | McNeece | 219/69 G |
| 3,662,142 | 5/1972 | Olsson | 219/69 G |
| 3,714,537 | 1/1973 | Bur | 318/626 |
| 3,721,795 | 3/1973 | Lobur | 219/69 G |

*Primary Examiner*—C. C. Shaw
*Attorney, Agent, or Firm*—Hauke and Patalidis

[57] ABSTRACT

In electrical discharge machining, an electrode is displaced towards a workpiece at a rate controlled as a function of the sparking conditions. The relative position of the electrode and workpiece is measured and, beyond a preset [reference] relative position, advance of the electrode is slowed as a function of the displacement past the reference position, or is stopped at the reference position, while continuing sparking and allowing withdrawal of the electrode if necessitated by the sparking conditions.

6 Claims, 3 Drawing Figures

R8
B
R6
R7
16
17
R5
9
R3
14
15
11a
11
13
A
10
R2
7
OP-AMP
R4
8
6
MEASURING CIRCUIT
U
S
12
1
5
4
2
R1
3
PULSE GENERATOR

OP-AMP
MEASURING CIRCUIT
DIGITAL COMPARATOR
DETECTOR
PULSE GENERATOR

MEASURING CIRCUIT
OP-AMP
CALCULATOR
PULSE GENERATOR

ELECTRIC DISCHARGE MACHINING METHOD AND DEVICE WITH PRESET ELECTRODE

Matter enclosed in heavy brackets [ ] appears in the original patent but forms no part of this reissue specification; matter printed in italics indicates the additions made by reissue.

*BACKGROUND OF THE INVENTION*

The invention relates to electrical discharge machining in which the displacement of a tool-forming electrode (hereinafter called electrode) relative to a workpiece-forming electrode (hereinafter called workpiece) is regulated to maintain a quantity characterizing the sparking conditions at a predetermined value.

When machining a recess, *cavity* or blind hole in the workpiece, it is known to stop the machining current, usually by means of a micro-switch, as soon as the electrode has penetrated in the workpiece by a predetermined amount. However, precise machining tolerances can only be achieved in this manner by resorting to several tedious operations to take into account the precision of the micro-switch and the presumed spark distance. This distance is difficult to evaluate since it varies with the machining parameters, especially with the conditions of [replacement of the] *renewal of the dielectric or* machining fluid. Moreover, it is not possible to guarantee that the frontal machined surface will be of equal quality to the lateral machined surfaces. Usually, the frontal surface is in [a] much [poorer] *rougher* state than the lateral ones.

An aim of the invention is to [enable] *eliminate* these disadvantages [to be eliminated] by providing a specific regulation of the relative position of the electrode and workpiece.

According to the invention, a method of machining by providing intermittent electrical discharges between an electrode and a workpiece while regulating relative displacement of the electrode and workpiece to maintain a quantity characterizing the sparking conditions at a predetermined value, comprises reducing the [rate] *maximum speed* of penetration of the electrode in the workpiece as a function of a quantity representing their relative position in a manner to prevent the electrode from penetrating in the workpiece beyond at least one predetermined final relative position while maintaining the electrical discharges and allowing the electrode and workpiece to be free to move relative to one another as a function of the sparking conditions up to said final relative position.

Hence, when the electrode reaches a predetermined position of penetration, the mean machining current [reduces] *drops* progressively to zero and the machining stops without any mechanical action. An advantage of this method is to progressively reduce the local pollution due to machining residues in the frontal zone which enables, at the end of operation, the obtention of a sparking distance just greater than that necessary for breakdown in a clean dielectric.

In these conditions, the sparking distance has a known, reproduceable value. During the entire phase of stopping machining, the electrodes remain under voltage, and the possibility of rapid withdrawal of the electrode in the case of short-circuiting is maintained.

Another advantage of the new method is to ensure that the state, *or more specifically the roughness* of the frontal surface is similar to that of the lateral surfaces at the end of each machining operation. [This advantage could not be obtained by, for example, a method consisting of applying non-erosive machining conditions with discharges of very low energy, once the electrodes have reached a predetermined relative position.]

Finally, a precise electronic servo-control and knowledge of the distance separating the electrodes at the end of machining enable high precision machining to be carried out, and simplify the operations of setting the dimensions to be machined.

*SUMMARY OF THE INVENTION*

The invention applies both to the control of frontal machining and the control of lateral machining employing a cyclic translational movement of variable amplitude (eccentricity). In the latter case, the invention additionally permits the correction of errors due to the geometrical configuration of the workpiece after a period of machining during which the speed of translational movement is constant and the amplitude (eccentricity) of the movement varies in a manner to maintain given sparking conditions in the machining zone.

The invention also concerns a device for carrying out the method.

The accompanying drawings show, schematically and by way of example, four embodiments. In the drawings:

*DETAILED DESCRIPTION OF THE PREFERRED EMBODIMENTS*

Figure 1:
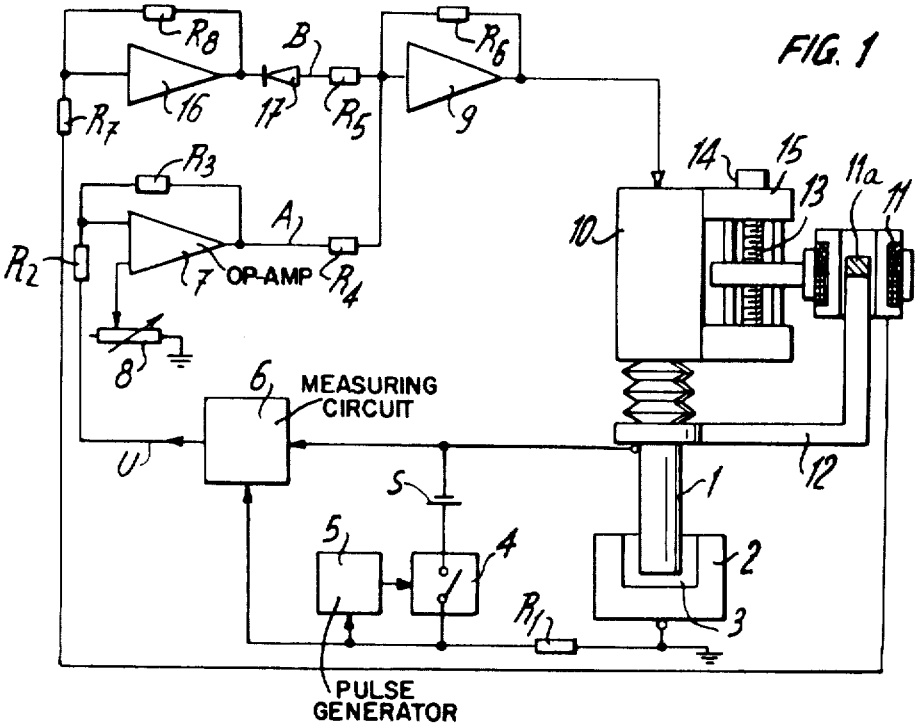
FIGS. 1 [to 3] *and 2* are circuit diagrams of [three] electrical discharge machining devices in which the electrode simply moves forwards towards the workpiece; and FIG. [4] *3* is a circuit diagram of a device similar to that of FIG. 1, but in which the electrode moves in translation relative to the workpiece.

The device of FIG. 1 comprises an electrode 1 able to move towards a workpiece 2 to bore the latter. The sparking space or machining zone 3 is situated mainly in front of the end face of electrode 1.

Intermittent electric discharges are provided from a d.c. current source S whose current is chopped by a power switch 4 itself controlled by a pulse generator 5. Each pulse produces a voltage drop across a resistor $R_1$, which provides a current-flow signal to a circuit 6 measuring the sparking conditions. This circuit 6 is also sensitive to the voltage between the electrode 1 and workpiece 2.

Circuit 6 supplies an output signal U, representing the machining conditions, which is applied via a resistor $R_2$ to an input of an operational amplifier 7. The other input of amplifier 7 receives a reference voltage from a potentiometer 8. The gain of amplifier 7 is defined, in known manner, by a feedback resistor $R_3$. On its output line A, amplifier 7 supplies a signal as a function of the difference between the output quantity of circuit 6 and the reference quantity taken on potentiometer 8.

The signal delivered on line A is applied by a resistor $R_4$ to the input of an amplifier 9 whose gain is set by a resistor $R_6$. Amplifier 9 controls a *servo* device 10 for [adjusting] the speed of displacement of the electrode 1 relative to workpiece 2.

The part of the circuit described above [is conventional] *corresponds to the state of the art.* In general, the measuring circuit 6 is arranged so that an increase in the mean voltage between the electrode 1 and workpiece 2, which signifies that the machining space *or gap* is greater than the chosen value, controls a further advance of the *servo* device 10. If the machining current increases abnormally, producing an increase in the voltage taken across resistor $R_1$, the measuring circuit 6 gives a signal which serves to reduce the *maximum* speed of advance of the electrode 1, or even to reverse it to provide a momentaneous withdrawal of the electrode 1 from workpiece 2.

To carry out the method according to the invention, the electrode advancing device also comprises an indicator of the position of electrode 1. This indicator is formed of a *position transducer having a* fixed part carrying a winding 11 and a movable core 11a mounted on a supporting arm 12 fixed to the electrode 1. The position of the part supporting winding 11 can be set by means of a screw 13 mounted on a fixed bracket 15 and having an actuating knob 14. By turning the knob 14, it is possible to set a reference position from which the machining operation should be brought to an end.

The fixed winding 11 supplies an analog signal [whose sign reverses when the electrode reaches said] *which has a value proportional to the deviation from the reference position and a sign indicating whether the movable core 11a is above or below the* reference position. This analog signal is applied by a resistor $R_7$ to an amplifier 16 whose gain is set by a resistor $R_8$. The [lead-out] *output* of amplifier 16 is connected via a diode 17 and a resistor $R_5$ to the input of amplifier 9. The diode 17 ensures that the output signal of amplifier 16 is only delivered to amplifier 9 when said signal is negative.

The position [detector] *transducer* is arranged so that it delivers a positive signal as long as the electrode 1 has not reached said reference position. After amplification by the amplifier 16, this positive signal is blocked by the diode 17 and has no effect on machining. When the reference position [voltage] is passed, the signal *at the output* of the [detector] *position transducer* reverses and is hence delivered to the input of amplifier 9. It should be noted that the signals delivered by the amplifiers 7 and 16 are connected to a voltage divider formed by the resistors $R_4$ and $R_5$. In this manner, the greater the amount by which the electrode 1 has passed by said reference position, the greater will be the signal delivered by amplifier 16. This signal thus provides a greater and greater opposition to the advance controlled by circuit 6. When the reference position has been passed by a certain amount, the corresponding position signal reaches a value at which it prevents any advance of the electrode 1, and working is finished. In these conditions, the frontal sparking distance 3 between the electrode 1 and workpiece 2 has reached its maximum value and is equal to the lateral distance between the electrode 1 and the recess it has formed in the workpiece 2.

During the entire period when the position signal, amplified by the amplifier 16, acts on the input of amplifier 9, any orders for withdrawal of the electrode due to an increase in short circuiting, and controlled by the circuit 6, remain effective, since they are of the same sign as the output signals of amplifier 16 which pass through the diode 17.

Figure 2:
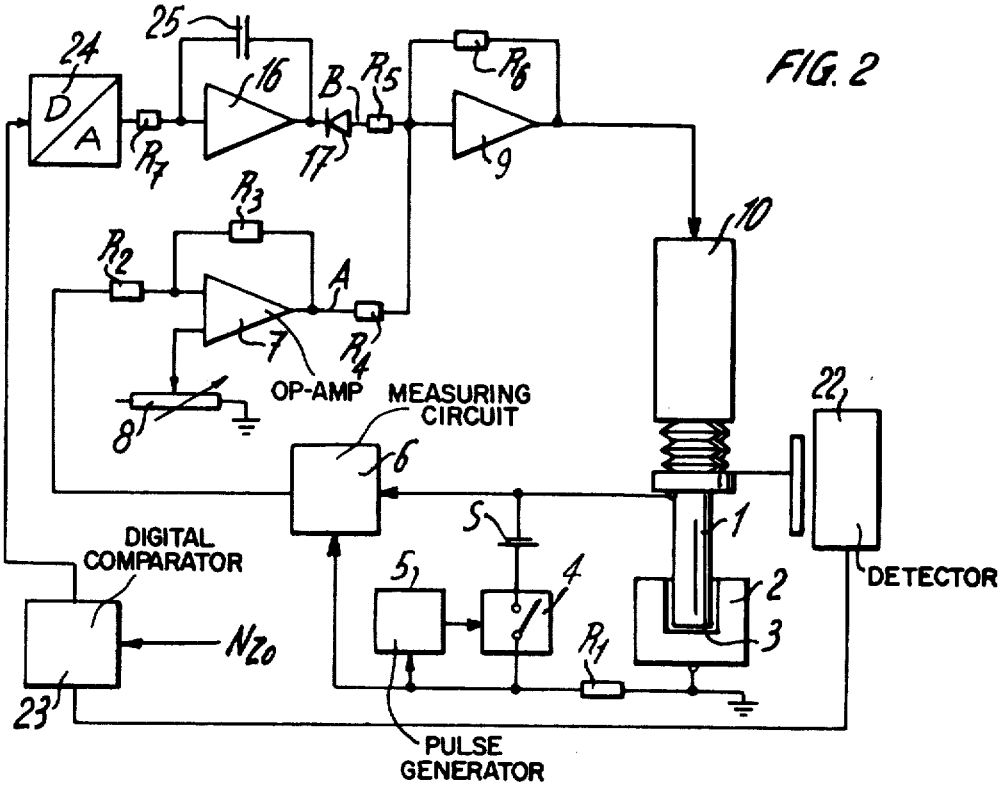

[FIG. 2 shows a second embodiment which includes the same elements 1 to 16 as the first embodiment. However, the device for controlling displacement of the electrode functions as an integrator and consequently the regulated position of the electrode is that which corresponds to a zero position-separation signal of the position detector (fixed winding 11 and core 11a).]

[The output signal of amplifier 16 is applied to an input of a differential amplifier 18 whose other input is grounded. In this manner, the sign of the output signal of amplifier 18 on line C will depend on the polarity of the output signal of amplifier 16. The output signal of amplifier 18 is applied by two diodes 19 and 20 to two field-effect transistors $T_1$ and $T_2$. Transistor $T_1$ is connected in series between the output of amplifier 7 and the input of amplifier 9, and is shunted by a diode 21. Transistor $T_2$ is connected to short-circuit the output of amplifier 16.]

[As long as the electrode 1 has not reached the reference position, the output signal of amplifier 16 is positive, as is that of the differential amplifier 18. Thus, the output signal of amplifier 18 is blocked by diodes 19 and 20, and the transistors $T_1$ and $T_2$ are in the conducting state as the resistors $R_9$ and $R_{10}$ hold their bases at ground potential. The output signal of amplifier 7 thus acts on the input of amplifier 9, whereas the output signal of amplifier 16 is short-circuited by transistor $T_2$ and does not reach the amplifier 9.]

[When the electrode 1 passes the reference position, the output signals of amplifiers 16 and 18 become negative. By diodes 19 and 20, the bases of transistors $T_1$ and $T_2$ are brought to negative potential, so that the two transistors become non-conducting. Consequently, positive output signals of amplifier 7, which control the advance of electrode 1, can no longer reach the amplifier 9. To the contrary, negative output signals of amplifier 7, which control withdrawal of the electrode 1 in the case of a too-great increase in the machining current, can reach the amplifier 9 via diode 21. Also, the output signals of amplifier 16 are no longer delivered to ground by transistor $T_2$ but are delivered via resistor $R_5$ to amplifier 9.]

[In this manner, as soon as the electrode 1 reaches its refernce position it can no longer advance towards the workpiece 2; to the contrary, it can be withdrawn if the machining conditions make this necessary.]

[To accelerate the final period at the end of machining, if desired, it is possible to provide at the output of amplifier 18 a circuit providing hysterisis or delay line D, i.e. means for delaying the action of the amplifier 18 on the transistors $T_1$ and $T_2$. In this manner, the action of the second regulating quantity (i.e. that from the position detector) is maintained until the electrodes move apart by a predetermined distance from said relative reference position. A momentaneous but limited passing of the electrode 1 past the reference position is thus permitted.]

[If it is not wished to improve the performance of the device of FIG. 2 by the addition of a hysterisis circuit, or delay line the device could be simplified by eliminating the transistor $T_2$ and providing, as in FIG. 1, a diode 17 at the lead-out of amplifier 16.]

FIG. [3 shows a third] *2 illustrates an* embodiment similar to that of FIG. 1, the same elements being designated by the same references. The [previous] *previously described* position detector *or transducer* is however replaced by a detector 22 giving a digital display of the position of electrode 1. The digital position signal is supplied to a digital comparator 23 which compares it with *a* reference number $N_{zo}$ representing the reference position. The output of comparator 23 is applied to a digital-analog converter 24 which supplies the input signal of amplifier 16. Instead of being shunted by a resistor $R_8$, as in FIG. 1, the amplifier 16 is shunted by a capacitor 25 so that it functions as an integrator. In this way, the position-separation signal set up by the comparator 23 is integrated, which enables the electrode 1 to be maintained in the reference position fixed by number $N_{zo}$.

The [fourth] embodiment illustrated in FIG. [4 is] *3 is also* similar to that of FIG. 1. However, the electrode 1 is not mounted for advance towards the workpiece 2, but is moved with a cyclic translational movement controlled by a table 26 movable in mutually perpendicular directions. This table is actuated by two motors $M_1$ and $M_2$ receiving control signals from a calculator 27 having two inputs, one for a signal $\omega$ controlling the speed of movement, the other for a signal R controlling the amplitude of the translational movement.

Signal R is also applied to a comparator amplifier 28 shunted by a resistor $R_{12}$, to provide a signal of the difference between the quantity R and a reference quantity supplied by a potentiometer 29. When the quantity R becomes greater than this reference quantity, the output signal of amplifier 28 becomes negative and, by diode 17, acts on the input of an amplifier 30 which is shunted by a capacitor 31 and hence acts an integrator. Amplifier 30 also receives the output signal of amplifier 7 and has substantially the same role as the amplifier 9 of FIG. 1.

Figure 3:
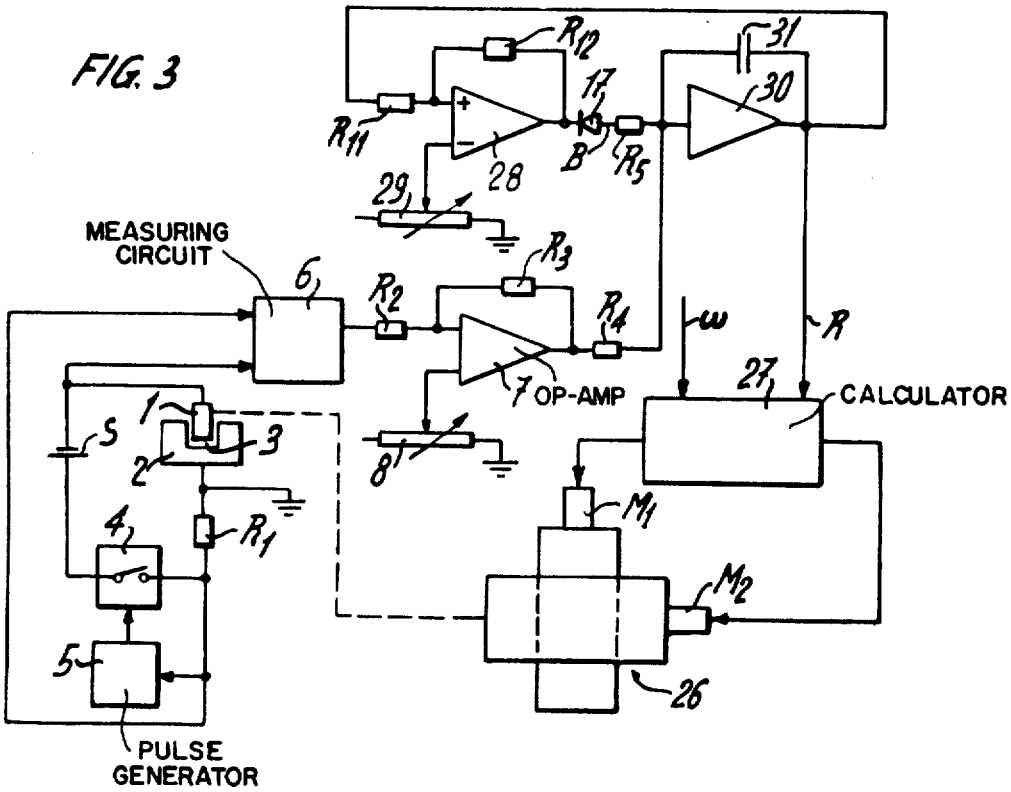

It is also possible to use the invention when the amplitude (eccentricity) of the translational movement is varied in proportion to the relative displacements of the electrode and workpiece along the axis of penetration of the electrode in the workpiece. In this case, it would be possible to use the circuit of [FIGS. 1, 2 or 3] *FIG. 1 or 2* and to provide a rigid linkage between the forward displacement of the electrode 1 and the amplitude (eccentricity) of the translational movement. In this manner, the advantages of the invention may be extended to three-dimensional machining.

We claim:

1. A method of machining by applying electrical pulses providing intermittent electrical discharges between an electrode and a workpiece while regulating their relative displacement to maintain a quantity characterizing the sparking conditions at a predetermined value, said method comprising *progressively* reducing the [rate] *speed* of penetration of the electrode in the workpiece as a function of a quantity representing their relative position in a manner to prevent the electrode from penetrating in the workpiece beyond at least one predetermined final relative position [while maintaining the electrical discharges], allowing the electrode and workpiece freedom to move relative to one another as a function of the sparking conditions up to said final relative position and stopping the relative motion of said electrode and workpiece upon reaching said final relative position while maintaining the electrical pulses across said electrode and workpiece.

2. A method according to claim 1, in which said predetermined final relative position is situated on the axis of pentration of the electrode in the workpiece.

3. A method according to claim 1, in which the electrode and workpiece are displaced relative to one another with a cyclic translational movement, and comprising preventing the electrode and workpiece from passing beyond final relative positions situated on a predetermined trajectory of this translational movement.

4. An electrical discharge machining device comprising means for providing intermittent electrical discharges between an electrode and a workpiece, means for providing a first regulating quantity as a function of the difference between a quantity characterizing the sparking conditions and a reference quanity, means for displacing the electrode and workpiece relative to one another as a function of said first regulating quantity, means for measuring the relative position of the electrode and workpiece, means for providing a second regulating quantity as a function of the difference between the measured relative position and at least one reference relative position, means for *progressively* reducing the speed of relative displacement of the electrode and workpiece as a function of said second regulating quantity until said reference position is reached and means for stopping said relative displacement as soon as said reference position has been reached, while constantly allowing the electrode and workpiece to move relative to one another as a function of said first regulating quantity.

5. A device according to claim 4, comprising means [(diode 17)] for preventing control of displacement of the electrode and workpiece as a function of said second regulating quantity as long as said reference position has not been reached while allowing the electrode and workpiece to move towards one another as a function of said first regulating quantity when the reference position has been reached.

6. A device according to claim 4, comprising means [(18, 20)] for preventing control of displacement of the electrode and workpiece as a function of said second regulating quantity as long as said reference position has not been reached, and means [(18, 19, $T_1$)] for preventing the electrode and workpiece from moving towards one another as a function of said first regulating quantity when the reference position has been reached.

[7. A device according to claim 6, comprising means for maintaining the action of said second regulating quantity until the electrode and workpiece have moved by a predetermined distance beyond said relative reference position.]

* * * * *

UNITED STATES PATENT AND TRADEMARK OFFICE

CERTIFICATE OF CORRECTION

PATENT NO. : Re. 31,494

DATED : January 10, 1984

INVENTOR(S) : Francois Balleys et al.

It is certified that error appears in the above-identified patent and that said Letters Patent are hereby corrected as shown below:

In the title: After "ELECTRODE" insert --FEED--.

Signed and Sealed this

Eighth Day of May 1984

[SEAL]

Attest:

GERALD J. MOSSINGHOFF

Attesting Officer

Commissioner of Patents and Trademarks